(12) United States Patent
Peng et al.

(10) Patent No.: US 10,698,620 B2
(45) Date of Patent: Jun. 30, 2020

(54) DYNAMIC CACHE ALLOCATION

(71) Applicant: Intel Corporation, Santa Clara, CA (US)

(72) Inventors: Chao Peng, Beijing (CN); Yao Zu Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/553,845

(22) PCT Filed: Mar. 27, 2015

(86) PCT No.: PCT/CN2015/075238
§ 371 (c)(1),
(2) Date: Aug. 25, 2017

(87) PCT Pub. No.: WO2016/154807
PCT Pub. Date: Oct. 6, 2016

(65) Prior Publication Data
US 2018/0052630 A1 Feb. 22, 2018

(51) Int. Cl.
*G06F 3/06* (2006.01)
*G06F 12/0842* (2016.01)
(Continued)

(52) U.S. Cl.
CPC .......... *G06F 3/0631* (2013.01); *G06F 3/0604* (2013.01); *G06F 3/0653* (2013.01);
(Continued)

(58) Field of Classification Search
CPC ................. G06F 3/0631; G06F 3/0604; G06F 2212/1041; G06F 2212/604; G06F 2212/6046
See application file for complete search history.

(56) References Cited

U.S. PATENT DOCUMENTS 7,107,403 B2 * 9/2006 Modha ............... G06F 9/5016
709/226
2008/0244533 A1 * 10/2008 Berg ............... G06F 11/3447
717/128
(Continued)

FOREIGN PATENT DOCUMENTS

CN 101419535 A 4/2009

OTHER PUBLICATIONS

International Search Report and Written Opinion issued in PCT Application No. PCT/CN2015/075238, dated Dec. 31, 2015, 6 pages.
(Continued)

*Primary Examiner* — David Yi
*Assistant Examiner* — Nicholas A. Paperno
(74) *Attorney, Agent, or Firm* — Grossman, Tucker, Perreault & Pfleger PLLC

(57) ABSTRACT

One embodiment provides a system. The system includes a processor, a cache memory, a performance monitoring unit (PMU), at least one virtual machine (VM), and cache sensitivity index (CSI) logic. The processor includes at least one core. The at least one virtual machine (VM) is to execute on at least one of the at least one core. The cache sensitivity index (CSI) logic is to allocate a cache portion to a selected VM, the allocated cache portion related to a determined cache portion, determined based, at least in part, on a CSI related to the selected VM.

21 Claims, 3 Drawing Sheets

(51) Int. Cl.
    *G06F 12/0888* (2016.01)
    *G06F 12/0855* (2016.01)
    *G06F 12/0802* (2016.01)

(52) U.S. Cl.
    CPC .......... *G06F 3/0664* (2013.01); *G06F 3/0673* (2013.01); *G06F 12/0802* (2013.01); *G06F 12/0842* (2013.01); *G06F 12/0857* (2013.01); *G06F 12/0888* (2013.01); *G06F 2212/1041* (2013.01); *G06F 2212/151* (2013.01); *G06F 2212/604* (2013.01); *G06F 2212/6046* (2013.01)

(56) References Cited

U.S. PATENT DOCUMENTS

| | | |
|---|---|---|
| 2011/0231857 A1 | 9/2011 | Zaroo et al. |
| 2011/0238919 A1 | 9/2011 | Gibson et al. |
| 2012/0210068 A1 | 8/2012 | Joshi et al. |
| 2014/0012940 A1 | 1/2014 | Joshi et al. |
| 2014/0344504 A1* | 11/2014 | Luo .................... G06F 12/0842 711/103 |

OTHER PUBLICATIONS

International Preliminary Report on Patentability and Written Opinion issued in PCT Application No. PCT/CN2015/075238, dated Oct. 3, 2017, 4 pages.
Extended European Search Report received in European Patent Application No. 15886794.5 dated Nov. 26, 2018, 12 pages.

* cited by examiner

DYNAMIC CACHE ALLOCATION

FIELD

The present disclosure relates to cache allocation, in particular to, dynamic cache allocation.

BACKGROUND

Computing systems such as portable computers, desktop computers, tablet computers, smartphones, etc., include at least one processor that may include a plurality of processing units (i.e., cores). Each processor may be associated with one or more cache memories ("cache"). The cache memories may be arranged in levels. For example, each processing unit may be associated with a respective dedicated first level cache. One or more intermediate level cache(s) may be associated with each of one or more subsets of the plurality of processing units. A last level cache (LLC) is typically shared by the plurality of processing units. A respective portion of the LLC may be allocated to each of the plurality of cores. The portion may be static, i.e., may not change during operation of the computing system.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
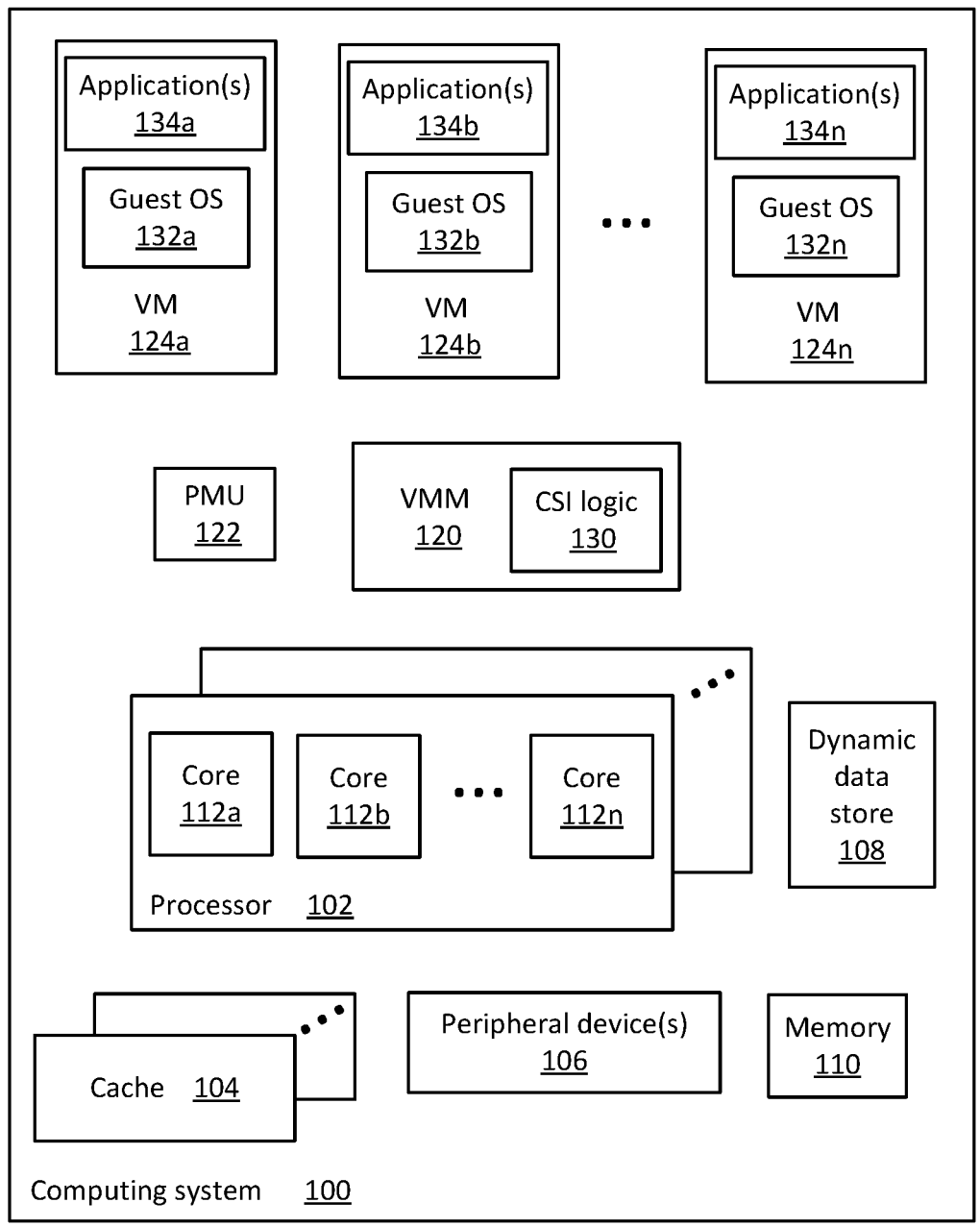
FIG. 1 illustrates a functional block diagram of a system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Static cache allocation may be adequate when memory access characteristics are generally known. In some applications, memory access characteristics and thus, cache usage, may vary over time. It may thus be beneficial to allocate cache portion(s) based, at least in part, on dynamic memory access characteristics, i.e., dynamic cache usage.

Generally, this disclosure relates to dynamic cache allocation. The methods and systems are configured to determine a cache sensitivity index (CSI) for each virtual machine (VM) of a plurality of VMs included in a computing system. Each CSI is configured to represent dynamic memory access characteristics for a respective VM. Each CSI relates a change in cache miss rate to an incremental increase in allocated cache for a respective VM. The CSI may be determined periodically and a duration of a time interval between determinations ("VM detection time interval") for each VM may vary. The cache allocation for a selected VM may then be set and/or adjusted based, at least in part, on a CSI associated with the selected VM and based, at least in part, on CSI(s) associated with other VM(s). Thus, cache may be allocated dynamically to accommodate time varying memory access characteristics.

In some embodiments, a plurality of classes of service (COSs) may be defined where each COS represents a relative importance of each of a plurality of applications that may be executing on one or more processing unit(s) (i.e., core(s)) of a processor. Cache may be allocated based, at least in part, on the relative COS of each application, core and/or VM. For example, relatively higher priority classes may be allocated a relatively larger cache portion and relatively lower priority classes may each be allocated a relatively smaller cache portion. Thus, relatively higher priority classes of applications, cores and/or VMs may benefit from relatively shorter latencies associated with accessing cache memories compared to latencies associated with accessing random access memory (RAM).

In an embodiment, a VM associated with a priority COS ("priority VM") may be allocated minimum a cache portion that is independent of CSI. Such allocation is configured to ensure that an application executing on the priority VM is allocated at least a minimum cache portion (i.e., a priority cache allocation). In other words, if a cache portion determined based, at least in part, on a determined CSI value for the priority VM is less than the priority cache allocation, then the priority VM may be allocated the priority cache allocation, as described herein.

In an embodiment, a history of CSI values, i.e., a plurality of CSI values associated with time stamps, may be captured and stored over time. The history may then be utilized to predict CSI value(s), as described herein. Such prediction may reduce overhead associated with determining CSI value(s) at each detection time interval.

Thus, dynamic, time varying, memory access characteristics may be accommodated for each of a plurality of VMs.

FIG. 1 illustrates a system block diagram of a computing system 100 consistent with several embodiments of the present disclosure. Computing system 100 may include, but is not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer, a mobile telephone including, but not limited to, a smart phone, (e.g., iPhone®, Android®-based phone, Blackberry®, Symbian®-based phone, Palm®-based phone, etc.), etc.

Computing system 100 includes one or more processor(s), e.g., processor 102, one or more cache memory(ies), e.g., cache 104, one or more peripheral device(s) 106, dynamic data store 108 and memory 110. Processor 102 is configured to perform operations associated with computing device 100. Processor 102 includes one or more processing unit(s) (i.e., core(s)) 112*a*, 112*b*, . . . , 112*n*. Each core 112*a*, 112*b*, . . . , 112*n* may be configured to execute one or more application(s) and/or one or more thread(s). One or more core(s) 112*a*, 112*b*, . . . and/or 112*n* may be associated with a VM, as described herein. At least some of the cores 112*a*, 112*b*, . . . and/or 112*n* may be configured to share cache 104, as described herein. Cache 104 typically has less storage capacity than memory 110 and is configured to store copies of data from relatively frequently accessed memory locations included in memory 110. Peripheral devices 106 may include, for example, user interface device(s) including a display, a touch-screen display, printer, keypad, keyboard, etc., sensor(s) including accelerometer, global positioning system (GPS), gyroscope, etc., input/output (I/O) port(s), communication logic, wired and/or wireless, storage device(s) including hard disk drives, solid-state drives, removable storage media, etc. Memory 110 includes any type of memory technology, as described herein.

Computing system 100 may further include virtual machine monitor (VMM) 120, performance monitoring unit (PMU) 122 and one or more VM(s) 124a, 124b, . . . , 124n. VMM 120 may include CSI logic 130. Each VM 124 a, 124b, . . . , 124n may host a respective guest operating system (OS) 132a, 132b, . . . , 132n and at least one application 134a, 134b, . . . , 134n, respectively.

Memory 110 may be configured to store one or more of dynamic data store 108, VMM 120, VM(s) 124a, 124b, . . . and/or 124n, guest OS(s) 132a, 132b, . . . and/or 132n and/or application(s) 134a, 134b, . . . , 134n.

The VMM (i.e., hypervisor) 120 is configured to provide an interface between VM(s) 124a, 124b, . . . and/or 124n and circuitry associated with computing system 100. In other words, the VMM 120 is configured to manage access to processor 102 (and/or core(s) 112a, 112b, . . . , 112n), cache 104, peripheral device(s) 106 and dynamic data store 108 by VM(s) 124a, 124b, . . . and/or 124n. VMM 120 is configured to provide guest OS(s) 132a, 132b, . . . and/or 132n with a virtual operating platform and to manage execution of guest OS(s) 132a, 132b, . . . and/or 132n.

PMU 122 is configured to monitor operation of processor 102 and/or core(s) 112a, 112b, . . . , 112n and to acquire performance monitoring data, e.g., count cache misses, as described herein. The PMU 122 may be further configured to associate performance monitoring data with a selected core and/or a selected VM. The acquired performance monitoring data may be stored in dynamic data store 108. For example, PMU 122 may be configured to count a number of cache misses for the selected VM in a time interval ("measurement time interval"). The number of cache misses is related to CSI, as described herein.

VMM 120 may be configured to associate each VM 124a, 124b, . . . and/or 124n with a selected COS. For example, a VM identifier (ID) and an associated COS ID may be stored in dynamic data store 108. Each COS may be related to a respective quality of service (QoS). QoS may be related to processing time. QoS may be affected by allocation of cache portions to one or more of VM(s) 124a, 124b, . . . and/or 124n. For example, a relatively higher cache allocation may result in a reduced processing time for applications that include operations that read and/or write data. A selected application may then be associated with a selected COS by executing the selected application on a VM associated with the selected COS. VMM 120 may be configured to implement a number of classes of service. At least one COS, e.g., COS 0, may be designated a priority COS, i.e., may have the highest priority. VMM 120 may be configured to allocate at least a minimum amount of cache 104 to a VM with COS 0 (i.e., a priority VM), as described herein. VMM 120 may be configured to allocate a respective default amount of cache 104 to each VM 124a, 124b, . . . , 124n according to an associated COS. For example, a relatively smaller COS value may correspond to a relatively higher priority. The default amount may be independent of CSI.

VMM 120 may be further configured to schedule execution of each VM 124a, 124b, . . . and/or 124n on one or more of core(s) 112a, 112b, . . . and/or 112n. When a VM is scheduled, the VM, e.g., VM 124a, and an associated guest OS, e.g., guest OS 132a, are configured to execute on the one or more core(s) 112a, 112b, . . . and/or 112n. An associated application, e.g., application 134a, may also execute. Scheduling efficiency may be enhanced by scheduling a selected VM on a same core or cores whenever the selected VM is scheduled. Thus, each VM may be associated with (i.e., pinned to) the same core(s) when the respective VM is scheduled.

CSI logic 130 is configured to determine a CSI value for each VM 124a, 124b, . . . and/or 124n. CSI logic 130 is further configured to determine a cache allocation for each VM, dynamically, based, at least in part, on the CSI(s), as described herein. CSI logic 130 may be configured to initiate a count of cache misses (e.g., by PMU 122) at a start of a respective measurement time interval and to detect (e.g., capture) the count for each VM 124a, 124b, . . . and/or 124n from PMU 122 at an end of the respective measurement time interval, as described herein.

Initially, default cache allocation(s) and a priority cache allocation may be set. The default cache allocation(s) correspond to static cache allocation(s). For example, a respective default cache allocation may be set for each COS. In another example, a default cache allocation may be set for non-priority COSs. The priority cache allocation corresponds to a minimum cache portion allocated to a priority VM, i.e., a VM associated with a priority COS, e.g., COS 0. The priority cache allocation may be set by a user, VMM 120 and/or CSI logic 130. The default cache allocation(s) and priority cache allocation are configured to ensure that a priority VM is allocated a cache portion that corresponds to at least the priority cache allocation. The priority cache allocation may be stored in dynamic data store 108.

During operation, a respective CSI value may be determined for selected VM(s) 124a, 124b, . . . and/or 124n. Initially, all active VM(s) may be selected and an initial CSI value determined for each VM. A VM may then be selected based, at least in part, on an associated VM detection time interval duration. For example, the VM detection time interval duration may be the same for all active VMs. In another example, a VM detection time interval may be determined for each VM based, at least in part, on variation (or lack thereof) in associated CSI values. Each VM detection time interval may correspond to a whole number multiple of a detection time interval increment. VM detection time interval(s) associated with VM(s) with relatively larger variations in CSI values may be relatively shorter duration than VM detection time interval(s) associated with VM(s) with relatively smaller variations in associated CSI values. The detection time interval increment may correspond to a minimum VM detection time interval duration. Thus, in this example, at the expiration of a detection time interval equal to the detection time interval increment duration, one or more CSI value(s) may be determined. Overhead associated with CSI determination may be reduced while capturing CSI variation and dynamically adjusting cache portion allocation.

Each CSI value may be determined by CSI logic 130. A VM may be selected by CSI logic 130. CSI logic 130 may be further configured to assign PMU 122 to each selected VM, e.g., via VMM 120. PMU 122 may then be configured to count cache misses over a measurement time interval for the assigned selected VM.

A duration of the measurement time interval may be configured to reduce overhead associated with PMU 122 operations when processor 102 and/or PMU 122 utilization is relatively high. For example, the measurement time interval may be specified as a portion of the detection time interval. In another example, the measurement time interval may correspond to the detection time interval. An end of the measurement time interval and/or the detection time interval may be indicated by, for example, an interrupt (based on a timer timeout), polling and/or a cache miss rate threshold value. For example, the detection time interval may be one second and the measurement time interval may be ten milliseconds (msec). In other examples, the detection time interval may be greater than or less than one second and the measurement time interval may be greater than or less than ten msec. The measurement time interval duration and the detection time interval duration may be stored in dynamic data store 108.

For example, at an expiration of a detection time interval, CSI logic 130 may be configured to initialize a cache miss count of PMU 122 to zero and to trigger PMU 122 to count cache miss(es) for the selected VM over a first measurement time interval. CSI logic 130 may then detect a first cache miss count, M1, from PMU 122. CSI logic 130 may then increase the cache allocation of the selected VM by a cache allocation increment, ΔS. A value of ΔS may be related to a capacity of cache 104, i.e., cache 104 size. For example, ΔS may be in the range of one percent (1%) to ten percent (10%) of the size of cache 104. The cache allocation increment ΔS may be stored in dynamic data store 108. CSI logic 130 may repeat initializing and triggering PMU 122 to count cache miss(es) over a second measurement time interval after increasing the cache allocation by ΔS. At the end of the second measurement time interval, CSI logic 130 may detect a second cache miss count, M2 from PMU 122. A CSI value, Ci (where i corresponds to the selected VM) for the selected VM may then be determined as Ci=(M1−M2)/ΔS. The CSI value, Ci, and a time stamp may then be associated with a VM ID that corresponds to the selected VM and stored in dynamic data store 108. A respective CSI value Ci may then be similarly determined for each other selected VM.

Generally, a relatively larger Ci corresponds to a VM that may experience a relatively larger benefit from an increased cache allocation portion compared to a VM that has a relatively smaller associated Ci. In other words, increasing the cache allocation portion of the VM that has the relatively larger associated Ci may result in a relatively larger decrease in cache misses compared to a VM that has a relatively smaller associated Ci.

CSI logic 130 may be configured to determine a respective cache portion for each VM 124a, 124b, . . . and/or 124n based, at least in part, on the determined CSI values. For example, the respective cache portions may be determined at or near the expiration of each detection time interval increment, after any CSI value determination(s). Thus, the respective cache portions may be determined based on newly determined CSI values and existing CSI values, determined prior to expiration of the current detection time interval. A size, $S_i$, of each respective cache portion is related to the CSI value for each VM and the CSI value(s) for VM(s) 124a, 124b, . . . and/or 124n. For example, the size, $S_i$, of each respective cache portion may be determined as:

$$S_i = S_{size} * \frac{C_i}{\sum_{i=1}^{n} C_i}$$

where $S_{size}$ is available cache size to be allocated, i is an index that corresponds to a respective VM and n is the number of VMs to be allocated a respective cache portion.

Generally, cache portions may be allocated as multiples of a minimum cache allocation amount. A size of the minimum cache allocation amount is related to a configuration of the cache. For example, the minimum cache allocation amount may be a multiple of a number of data blocks associated with a cache row (i.e., a cache line). Each cache data block may include a number of bytes and the total cache size may correspond to a product of the number of bytes in a data block and a number of blocks stored in the cache. Thus, each Si may be adjusted (i.e., increased or decreased) to correspond to a respective whole number multiple of the minimum cache allocation amount.

In an embodiment, CSI logic 130 may be configured to set and/or adjust an allocated cache portion based, at least in part, on a COS associated with a selected VM. For example, CSI logic 130 may be configured to allocate a priority cache portion independent of associated CSI value for the selected VM. In another example, CSI logic 130 may be configured to allocate a cache portion related to a determined cache portion to the selected VM. In this example, CSI logic 130 may be configured to determine the associated CSI value and associated cache portion (i.e., determined cache portion) for the selected VM, as described herein. CSI logic 130 may then be configured to compare the determined cache portion for the selected VM to the priority cache allocation. If the determined cache portion is greater than the priority cache allocation, the CSI logic 130 may be configured to allocate the determined cache portion to the selected VM. If the determined cache portion is less than or equal to the priority cache allocation, the CSI logic 130 may be configured to allocate the priority cache allocation to the selected VM. Thus, in this embodiment, cache portions may be dynamically allocated and priority VMs may be allocated at least a minimum cache portion.

After determining the cache portion(s) to be allocated to respective priority VM(s), the available cache size, $S_{size}$, may be reduced by the priority cache portion(s). Cache portion(s), $S_i$, may then be determined, as described herein, for any remaining, i.e., non-priority, VM(s), based, at least in part, on CSI value(s) of remaining VM(s). The determined cache portion(s) may then be allocated to the non-priority VM(s).

Thus, priority VM(s) may be dynamically allocated at least a priority cache allocation. A priority VM may be allocated a determined cache portion greater than the priority cache allocation based, at least in part, on cache usage. Non-priority VM(s) may then by dynamically allocated respective cache portion(s) based, at least in part, on cache usage.

Memory access characteristics and cache usage associated with each VM 124a, 124b, . . . and/or 124n may vary over time, i.e., are generally dynamic. Thus, CSI logic 130 may be configured to determine CSI values, $C_i$, repeatedly, at the expiration of VM detection time intervals. A duration of the VM detection time interval may also vary with time. In other words, the VM detection time interval duration may be configured to adapt to dynamically changing memory access characteristics. The VM detection time interval may correspond to a detection factor multiplied by the detection time interval increment, as described herein. For example, CSI logic 130 may be configured to compare a current CSI value to a corresponding prior CSI value stored in dynamic data store 108. If the current CSI value and prior CSI value are relatively close, then the CSI logic 130 may be configured to increase an associated VM detection time interval and to, thus, increase an amount of time between CSI determinations. If the current CSI value is different from the prior CSI value, then CSI logic 130 may be configured to decrease the associated VM detection time interval. For example, if the current CSI value is within a tolerance of the prior CSI value, the VM detection time interval may be increased. In another example, if the current CSI value in not within the tolerance of the prior CSI value, the VM detection time interval duration may be maintained or decreased. For example, the tolerance may be in the range of −0.0005 to +0.0005.

In an embodiment, CSI logic 130 may be configured to predict one or more CSI value(s) for selected VM(s) based, at least in part, on historical CSI data stored in dynamic data store 108. For example, the historical CSI data may include CSI value(s), an associated time stamp for each CSI value and an associated VM ID. CSI logic 130 may be configured to detect a current time value. For example, CSI 130 may be configured to predict a CSI value for a selected VM based, at least in part, on a time interval between the historical time stamp and a current time, e.g., a current time stamp, and based, at least in part, on associated stored CSI value(s). Such prediction may reduce an overhead associated with determining the CSI value. For example, PMU 122 operations associated with counting cache misses may contribute to processor 102 overhead. Reducing overhead may enhance efficiency of operation of computing system 100. For example, cache usage associated with a VM configured to execute a web services application may have a relatively larger CSI value at one or more specific time(s) of day. The predicted CSI may be associated with a relative time and/or a time stamp and the predicted CSI value may be used when determining the $S_i$ values. Thus, operations associated with determining the associated CSI value may be avoided.

Thus, a cache shared by a plurality of cores (and/or VMs) may be allocated dynamically based, at least in part, on memory access characteristics (i.e., cache usage). The cache allocation may be set and/or adjusted dynamically to accommodate variation with time of VM memory access characteristics for a plurality of VMs and/or relative priority of a COS associated with each VM. Time varying memory access characteristics may thus be accommodated.

Figure 2:
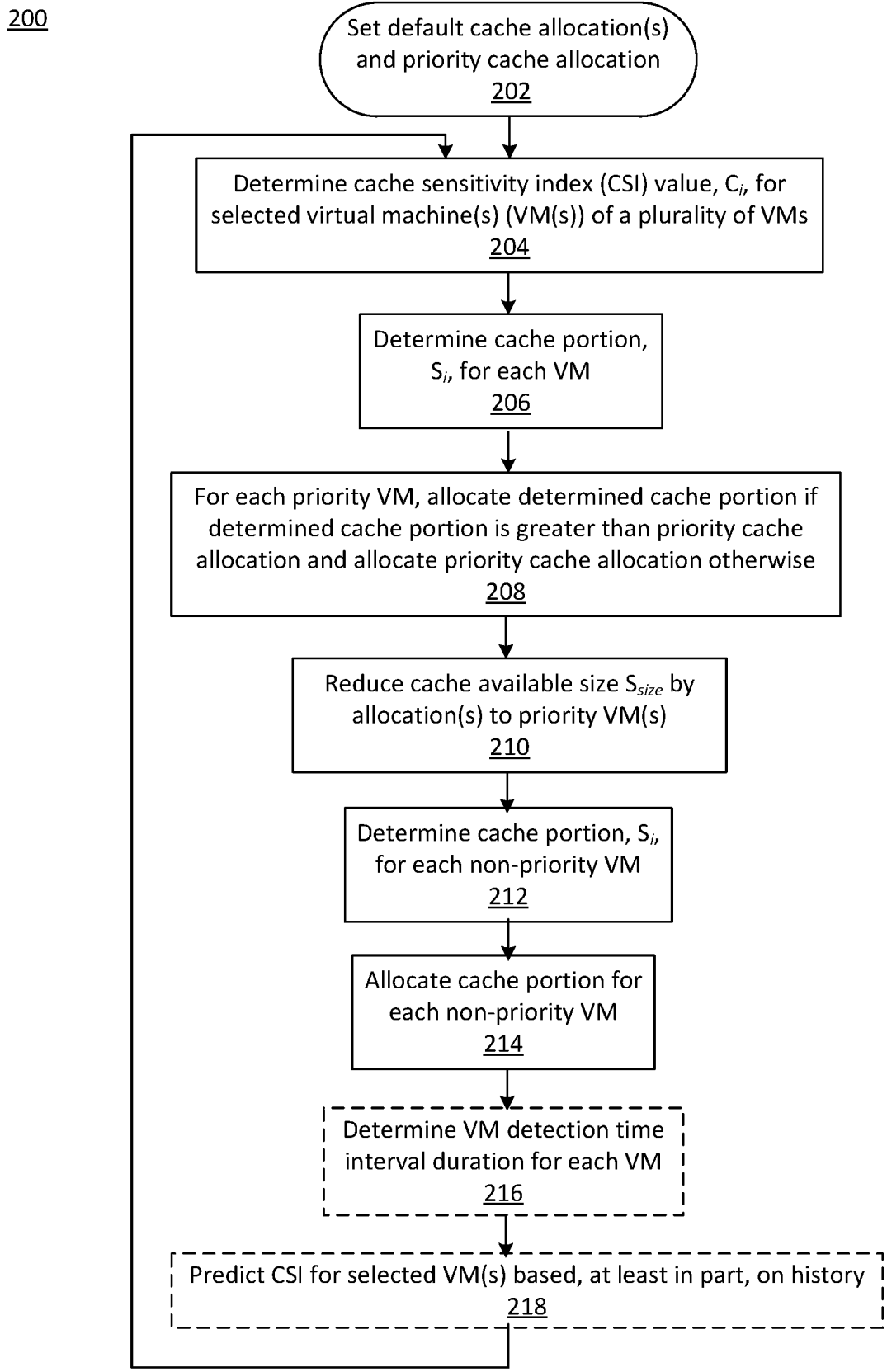
FIG. 2 is a flowchart of dynamic cache allocation operations according to various embodiments of the present disclosure.

FIG. 2 is a flowchart 200 of dynamic cache allocation operations according to various embodiments of the present disclosure. In particular, the flowchart 200 illustrates determining respective cache portions for each of a plurality of VMs based, at least in part, on CSI values. The operations may be performed, for example, by computing system 100, in particular, CSI logic 130 of FIG. 1.

Figure 3:
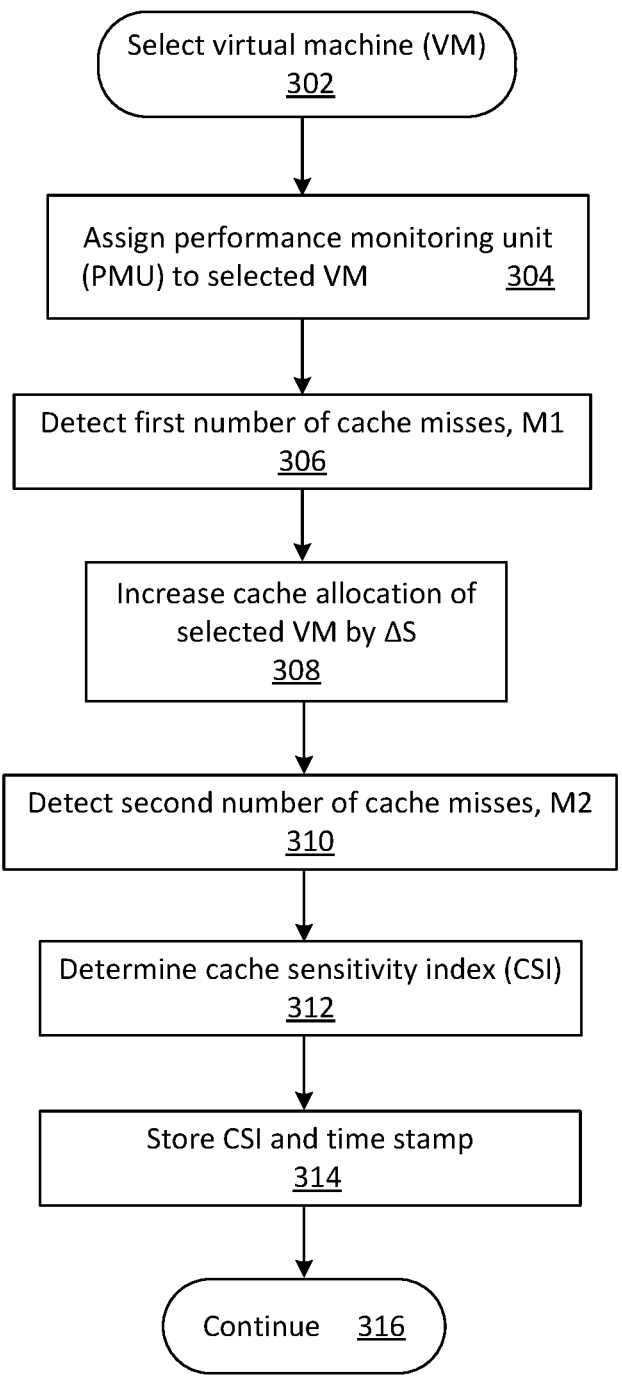
FIG. 3 is a flowchart of cache sensitivity index determination operations according to one embodiment of the present disclosure.

Operations of this embodiment may begin with setting default cache allocation(s) and a priority cache allocation 202. The default cache allocation(s) may be static and may be related to COS. The priority cache allocation corresponds to a minimum cache allocation for a priority VM. A CSI value may be determined for selected VM(s) of a plurality of VMs at operation 204. For example, each CSI value may be determined as illustrated in FIG. 3 and described below. A cache portion, $S_i$, may be determined for each VM at operation 206. For example, each cache portion, $S_i$, may be determined as $$S_i = S_{size} * \frac{C_i}{\sum_{i=1}^{n} C_i}$$

Operation 208 includes, for each priority VM, allocating the determined cache portion if the determined cache portion is greater than the priority cache allocation and allocating the priority cache allocation otherwise. In this manner, a priority VM cache allocation that is at least the priority cache allocation may be maintained. The cache available size, $S_{size}$, may be reduced by an amount corresponding to the allocation(s) to priority VM(s) at operation 210. A cache portion, $S_i$, for each non-priority VM may be determined at operation 212, as described herein. Each cache portion, $S_i$, may be allocated for each non-priority VM at operation 214. In some embodiments, a VM detection time interval may be determined for each VM at operation 216. For example, the VM detection time interval may be determined based, at least in part, on a difference between a current CSI value and a prior CSI value for a respective VM. In some embodiments, a CSI value for selected VM(s) may be predicted based, at least in part, on a history at operation 218. A predicted CSI value is configured to avoid determining a CSI value for at least some expirations of respective VM detection intervals. Program flow may then proceed to operation 204.

Thus, a CSI value may be determined for selected VM(s) of a plurality of VMs and a respective cache portion may be allocated to each of VM. Each respective cache portion may be related to a respective CSI. Priority VM(s) may be allocated at least a priority cache portion. Thus, time varying changes in memory access characteristics may be accommodated.

FIG. 3 is a flowchart 300 of CSI determination operations according to one embodiment of the present disclosure. In particular, flowchart 300 illustrates one example of operation 204 of FIG. 2. The operations may be performed, for example, by computing system 100, in particular, CSI logic 130 and VMM 120 and/or PMU 122 of FIG. 1.

Operations of this embodiment may begin with selecting a VM 302. A performance monitoring unit, e.g., PMU 122, may be assigned to the selected VM at operation 304. A first number of cache misses, M1, may be detected at operation 306. For example, the performance monitoring unit may be configured to count cache misses in a measurement time interval. The first count of cache misses may then be detected, i.e., captured, from the PMU. Operation 308 includes increasing a cache allocation of the selected VM by a cache allocation increment, ΔS. A second number of cache misses, M2, may be detected at operation 310. The second number of cache misses may be detected similar to detection of the first number of cache misses and with a same measurement time interval. Operation 312 includes determining a cache sensitivity index (CSI). For example, the CSI may be determined as (M1−M2)/ΔS. The determined CSI and an associated time stamp may be stored at operation 314. Program flow may continue at operation 316. The operations of flowchart 300 may be repeated for each selected VM.

Thus, a CSI may be determined for each selected VM in a plurality of VMs based, at least in part, on a number of cache misses in a measurement time interval, before and after incrementing a cache allocation by the cache allocation increment. Relative cache usage associated with respective memory access characteristics may thus be detected, e.g., quantified. Time varying changes in memory access characteristics for a plurality of VMs may thus be accommodated.

While the flowcharts of FIGS. 2 and 3 illustrate operations according various embodiments, it is to be understood that not all of the operations depicted in FIGS. 2 and 3 are necessary for other embodiments. In addition, it is fully contemplated herein that in other embodiments of the present disclosure, the operations depicted in FIGS. 2 and/or 3, and/or other operations described herein may be combined in a manner not specifically shown in any of the drawings, and such embodiments may include less or more operations than are illustrated in FIGS. 2 and/or 3. Thus, claims directed to features and/or operations that are not exactly shown in one drawing are deemed within the scope and content of the present disclosure.

VMM 120 may be configured to manage system resources and control tasks that are run on each respective VM, e.g., VM 124a, 124b, . . . , 124n, and/or system, e.g., computing system 100. VMM 120 may provide a layer of abstraction for underlying hardware to various virtual machines, e.g., VM 124a, 124b, . . . , 124n, running on one or more processing units, e.g., core(s) 112a, 112b, . . . , 112n. Guest operating system(s), e.g., guest OS(s) 132a, 132b, . . . , 132n, may be running on one or more virtual machines. For example, the OS(s) may be implemented using Microsoft Windows, HP-UX, Linux, or UNIX, although other operating systems may be used.

Memory 110 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, a system and method are configured to determine a cache sensitivity index (CSI) for each virtual machine (VM) of a plurality of VMs included in a computing system. Each CSI is configured to represent dynamic memory access characteristics for a respective VM. Each CSI relates a change in cache miss rate to an incremental increase in allocated cache for a respective VM. The CSI may be determined periodically and a duration of a time interval between determinations may vary. The cache allocation for a selected VM may then be set and/or adjusted based, at least in part, on a CSI associated with the selected VM and based, at least in part, on CSI(s) associated with other VM(s). Thus, cache may be allocated dynamically to accommodate time varying memory access characteristics.

EXAMPLES

Examples of the present disclosure include subject material such as a method, means for performing acts of the method, a device, or of an apparatus or system related to dynamic cache allocation, as discussed below.

Example 1

According to this example there is provided a system. The system includes a processor that includes at least one core; a cache memory; a performance monitoring unit (PMU); at least one virtual machine (VM) to execute on at least one of the at least one core; and cache sensitivity index (CSI) logic. The CSI logic is to allocate a cache portion to a selected VM, the allocated cache portion is related to a determined cache portion, determined based, at least in part, on a CSI related to the selected VM.

Example 2

This example includes the elements of example 1, wherein the PMU is to count a first number, M1, of cache misses, the CSI logic is to increase a cache allocation of the selected VM by a cache allocation increment, $\Delta S$, the PMU is further to count a second number, M2, of cache misses and the CSI logic is further to determine a CSI value based, at least in part, on M1, M2 and $\Delta S$.

Example 3

This example includes the elements of example 1, wherein the CSI logic is to allocate the determined cache portion to a priority VM if the determined cache portion is greater than a priority cache allocation.

Example 4

This example includes the elements according to any one of examples 1 through 3, wherein the CSI logic is to determine a VM detection time interval for the selected VM.

Example 5

This example includes the elements according to any one of examples 1 through 3, wherein the CSI logic is to predict a CSI value for the selected VM based, at least in part, on a history.

Example 6

This example includes the elements according to any one of examples 1 through 3, wherein the CSI logic is to determine the determined cache portion.

Example 7

This example includes the elements according to any one of examples 1 through 3, wherein the CSI logic is to set a default cache allocation and a priority cache allocation.

Example 8

This example includes the elements of example 7, wherein at least one of the priority cache allocation and/or the default cache allocation is related to a class of service (COS).

Example 9

This example includes the elements of example 2, wherein the CSI value is determined as $(M1-M2)/\Delta S$.

Example 10

This example includes the elements of example 3, wherein the CSI logic is further to reduce an available cache size by the priority cache allocation.

Example 11

This example includes the elements of example 6, wherein the CSI logic is to determine a sum of CSI values for a plurality of VMs and to determine an available cache size.

Example 12

This example includes the elements of example 6, wherein the determined cache portion is determined as a product of the available cache size and the CSI value for the selected VM divided by a sum of respective CSI values for each of one or more other VMs and the CSI value for the selected VM.

Example 13

This example includes the elements of example 2, wherein the first number of cache misses and the second number of cache misses are counted over a measurement time interval.

Example 14

This example includes the elements according to any one of examples 1 through 3, wherein the CSI logic is further to repeat the allocating at or near expiration of a selected VM time interval.

Example 15

This example includes the elements according to any one of examples 1 through 3, wherein the CSI logic is to determine a CSI value related to the selected VM at an expiration of a VM detection time interval related to the selected VM.

Example 16

This example includes the elements according to any one of examples 1 through 3, wherein the cache portion is allocated at or near an expiration of a VM detection time interval unrelated to the selected VM.

Example 17

This example includes the elements according to any one of examples 1 through 3, wherein the CSI logic is further to determine a CSI value related to the selected VM based, at least in part, on a measurement time interval and based, at least in part, on a VM detection time interval.

Example 18

This example includes the elements of example 17, wherein a duration of the measurement time interval is less than a duration of the VM detection time interval.

Example 19

This example includes the elements of example 17, wherein a duration of the measurement time interval is ten milliseconds and a duration of the VM detection time interval is one second.

Example 20

This example includes the elements of example 3, wherein the priority cache allocation is related to a class of service.

Example 21

This example includes the elements of example 2, wherein the cache allocation increment is in the range of one percent to ten percent of a total cache size.

Example 22

This example includes the elements of example 2, wherein the CSI logic is further to assign the PMU to the selected VM.

Example 23

This example includes the elements according to any one of examples 1 through 3, wherein the CSI represents dynamic memory access characteristics for the selected VM.

Example 24

This example includes the elements according to any one of examples 1 through 3, wherein the CSI logic is to allocate a priority cache allocation if the selected VM is a priority VM and the priority cache allocation is greater than the determined cache allocation.

Example 25

According to this example there is provided a method. The method includes allocating, by cache sensitivity index (CSI) logic, a cache portion to a selected virtual machine (VM), the allocated cache portion related to a determined cache portion, determined, based at least in part, on a CSI related to the selected VM.

Example 26

This example includes the elements of example 25, and further includes counting, by a performance monitoring unit (PMU), a first number, M1, of cache misses; increasing, by the CSI logic, a cache allocation of the selected VM by a cache allocation increment, $\Delta S$; counting, by the PMU, a second number, M2, of cache misses; and determining, by the CSI logic, a CSI value based, at least in part, on M1, M2 and $\Delta S$.

Example 27

This example includes the elements of example 25, and further includes allocating, by the CSI logic, the determined cache portion to a priority VM if the determined cache portion is greater than a priority cache allocation.

Example 28

This example includes the elements of example 25, and further includes and further includes determining, by the CSI logic, a VM detection time interval for the selected VM.

Example 29

This example includes the elements of example 25, and further includes predicting, by the CSI logic, a CSI value for the selected VM based, at least in part, on a history.

Example 30

This example includes the elements of example 25, and further includes determining, by the CSI logic, the determined cache portion.

Example 31

This example includes the elements of example 25, and further includes setting, by the CSI logic, a default cache allocation; and setting, by the CSI logic, a priority cache allocation.

Example 32

This example includes the elements of example 31, wherein at least one of the priority cache allocation and/or the default cache allocation is related to a class of service (COS).

Example 33

This example includes the elements of example 26, wherein the CSI value is determined as $(M1-M2)/\Delta S$.

Example 34

This example includes the elements of example 27, and further includes reducing, by the CSI logic, an available cache size by the priority cache allocation.

Example 35

This example includes the elements of example 30, and further includes determining, by the CSI logic, a sum of CSI values for a plurality of VMs; and determining, by the CSI logic, an available cache size.

Example 36

This example includes the elements of example 30, wherein the determined cache portion determined as a product of the available cache size and the CSI value for the selected VM divided by a sum of respective CSI values for each of one or more other VMs and the CSI value for the selected VM.

Example 37

This example includes the elements of example 26, wherein the first number of cache misses and the second number of cache misses are counted over a measurement time interval.

Example 38

This example includes the elements of example 25, and further includes repeating the allocating at or near expiration of a selected VM time interval.

Example 39

This example includes the elements of example 25, wherein a CSI value related to the selected VM is determined at an expiration of a VM detection time interval related to the selected VM.

Example 40

This example includes the elements of example 25, wherein the cache portion is allocated at or near an expiration of a VM detection time interval unrelated to the selected VM.

Example 41

This example includes the elements of example 25, wherein a CSI value related to the selected VM is determined based, at least in part, on a measurement time interval and based, at least in part, on a VM detection time interval.

Example 42

This example includes the elements of example 41, wherein a duration of the measurement time interval is less than a duration of the VM detection time interval.

Example 43

This example includes the elements of example 41, wherein a duration of the measurement time interval is ten milliseconds and a duration of the VM detection time interval is one second.

Example 44

This example includes the elements of example 27, wherein the priority cache allocation is related to a class of service.

Example 45

This example includes the elements of example 26, wherein the cache allocation increment is in the range of one percent to ten percent of a total cache size.

Example 46

This example includes the elements of example 26, and further includes assigning, by the CSI logic, the PMU to the selected VM.

Example 47

This example includes the elements of example 25, wherein the CSI represents dynamic memory access characteristics for the selected VM.

Example 48

This example includes the elements of example 25, and further includes allocating, by the CSI logic, a priority cache allocation if the selected VM is a priority VM and the priority cache allocation is greater than the determined cache allocation.

Example 49

According to this example there is provided a computer readable storage device having stored thereon instructions that when executed by one or more processors result in the following operations including: allocating a cache portion to a selected virtual machine (VM), the allocated cache portion related to a determined cache portion, determined, based at least in part, on a cache sensitivity index (CSI) related to the selected VM.

Example 50

This example includes the elements of example 49, wherein the instructions that when executed by one or more processors results in the following additional operations including: counting a first number, M1, of cache misses; increasing a cache allocation of the selected VM by a cache allocation increment, $\Delta S$; counting a second number, M2, of cache misses; and determining a CSI value based, at least in part, on M1, M2 and $\Delta S$.

Example 51

This example includes the elements of example 49, wherein the instructions that when executed by one or more processors results in the following additional operations including: allocating the determined cache portion to a priority VM if the determined cache portion is greater than a priority cache allocation.

Example 52

This example includes the elements of example 49, wherein the instructions that when executed by one or more processors results in the following additional operations including: determining a VM detection time interval for the selected VM.

Example 53

This example includes the elements according to any one of examples 49 through 51, wherein the instructions that when executed by one or more processors results in the following additional operations including: predicting a CSI value for the selected VM based, at least in part, on a history.

Example 54

This example includes the elements according to any one of examples 49 through 51, wherein the instructions that when executed by one or more processors results in the following additional operations including: determining the determined cache portion.

Example 55

This example includes the elements according to any one of examples 49 through 51, wherein the instructions that when executed by one or more processors results in the following additional operations including: setting a default cache allocation; and setting a priority cache allocation.

Example 56

This example includes the elements of example 55, wherein at least one of the priority cache allocation and/or the default cache allocation is related to a class of service (COS).

Example 57

This example includes the elements of example 51, wherein the CSI value is determined as $(M1-M2)/\Delta S$.

Example 58

This example includes the elements of example 52, wherein the instructions that when executed by one or more processors results in the following additional operations including: reducing an available cache size by the priority cache allocation.

Example 59

This example includes the elements of example 54, wherein the instructions that when executed by one or more processors results in the following additional operations including: determining a sum of CSI values for a plurality of VMs; and determining an available cache size.

Example 60

This example includes the elements of example 54, wherein the determined cache portion is determined as a product of the available cache size and the CSI value for the selected VM divided by a sum of respective CSI values for each of one or more other VMs and the CSI value for the selected VM.

Example 61

This example includes the elements of example 50, wherein the first number of cache misses and the second number of cache misses are counted over a measurement time interval.

Example 62

This example includes the elements according to any one of examples 49 through 51, wherein the instructions that when executed by one or more processors results in the following additional operations including: repeating the allocating at or near expiration of a selected VM time interval.

Example 63

This example includes the elements according to any one of examples 49 through 51, wherein a CSI value related to the selected VM is determined at an expiration of a VM detection time interval related to the selected VM.

Example 64

This example includes the elements according to any one of examples 49 through 51, wherein the cache portion is allocated at or near an expiration of a VM detection time interval unrelated to the selected VM.

Example 65

This example includes the elements according to any one of examples 49 through 51, wherein a CSI value related to the selected VM is determined based, at least in part, on a measurement time interval and based, at least in part, on a VM detection time interval.

Example 66

This example includes the elements of example 65, wherein a duration of the measurement time interval is less than a duration of the VM detection time interval.

Example 67

This example includes the elements of example 65, wherein a duration of the measurement time interval is ten milliseconds and a duration of the VM detection time interval is one second.

Example 68

This example includes the elements of example 51, wherein the priority cache allocation is related to a class of service.

Example 69

This example includes the elements of example 50, wherein the cache allocation increment is in the range of one percent to ten percent of a total cache size.

Example 70

This example includes the elements of example 50, wherein the instructions that when executed by one or more processors results in the following additional operations including: assigning the PMU to the selected VM.

Example 71

This example includes the elements according to any one of examples 49 through 51, wherein the CSI represents dynamic memory access characteristics for the selected VM.

Example 72

This example includes the elements according to any one of examples 49 through 51, wherein the instructions that when executed by one or more processors results in the following additional operations including: allocating, by the CSI logic, a priority cache allocation if the selected VM is a priority VM and the priority cache allocation is greater than the determined cache allocation.

Example 73

According to this example, there is provided a device. The device includes means for allocating, by cache sensitivity index (CSI) logic, a cache portion to a selected virtual machine (VM), the allocated cache portion related to a determined cache portion, determined, based at least in part, on a CSI related to the selected VM.

Example 74

This example includes the elements of example 73, and further includes means for counting, by a performance monitoring unit (PMU), a first number, M1, of cache misses; means for increasing, by the CSI logic, a cache allocation of the selected VM by a cache allocation increment, $\Delta S$; means for counting, by the PMU, a second number, M2, of cache misses; and means for determining, by the CSI logic, a CSI value based, at least in part, on M1, M2 and $\Delta S$.

Example 75

This example includes the elements of example 73, and further includes means for allocating, by the CSI logic, the determined cache portion to a priority VM if the determined cache portion is greater than a priority cache allocation.

Example 76

This example includes the elements according to any one of examples 73 through 75, and further includes means for determining, by the CSI logic, a VM detection time interval for the selected VM.

Example 77

This example includes the elements according to any one of examples 73 through 75, and further includes means for predicting, by the CSI logic, a CSI value for the selected VM based, at least in part, on a history.

Example 78

This example includes the elements according to any one of examples 73 through 75, and further includes means for determining, by the CSI logic, the determined cache portion.

Example 79

This example includes the elements according to any one of examples 73 through 75, and further includes means for setting, by the CSI logic, a default cache allocation; and means for setting, by the CSI logic, a priority cache allocation.

Example 80

This example includes the elements of example 79, wherein at least one of the priority cache allocation and/or the default cache allocation is related to a class of service (COS).

Example 81

This example includes the elements of example 74, wherein the CSI value is determined as $(M1-M2)/\Delta S$.

Example 82

This example includes the elements of example 75, and further includes means for reducing, by the CSI logic, an available cache size by the priority cache allocation.

Example 83

This example includes the elements of example 78, and further includes means for determining, by the CSI logic, a sum of CSI values for a plurality of VMs; and means for determining, by the CSI logic, an available cache size.

Example 84

This example includes the elements of example 83, wherein the determined cache portion is determined as a product of the available cache size and the CSI value for the selected VM divided by a sum of respective CSI values for each of one or more other VMs and the CSI value for the selected VM.

Example 85

This example includes the elements of example 74, wherein the first number of cache misses and the second number of cache misses are counted over a measurement time interval.

Example 86

This example includes the elements according to any one of examples 73 through 75, and further includes means for repeating the allocating at or near expiration of a selected VM time interval.

Example 87

This example includes the elements according to any one of examples 73 through 75, and further includes wherein a CSI value related to the selected VM is determined at an expiration of a VM detection time interval related to the selected VM.

Example 88

This example includes the elements according to any one of examples 73 through 75, wherein the cache portion is allocated at or near an expiration of a VM detection time interval unrelated to the selected VM.

Example 89

This example includes the elements according to any one of examples 73 through 75, wherein a CSI value related to the selected VM is determined based, at least in part, on a measurement time interval and based, at least in part, on a VM detection time interval.

Example 90

This example includes the elements of example 89, wherein a duration of the measurement time interval is less than a duration of the VM detection time interval.

Example 91

This example includes the elements of example 89, wherein a duration of the measurement time interval is ten milliseconds and a duration of the VM detection time interval is one second.

Example 92

This example includes the elements of example 75, wherein the priority cache allocation is related to a class of service.

Example 93

This example includes the elements of example 74, wherein the cache allocation increment is in the range of one percent to ten percent of a total cache size.

Example 94

This example includes the elements of example 74, and further includes means for assigning, by the CSI logic, the PMU to the selected VM.

Example 95

This example includes the elements according to any one of examples 73 through 75, wherein the CSI represents dynamic memory access characteristics for the selected VM.

Example 96

This example includes the elements according to any one of examples 73 through 75, and further includes means for allocating, by the CSI logic, a priority cache allocation if the selected VM is a priority VM and the priority cache allocation is greater than the determined cache allocation.

Example 97

According to this example there is a computer readable storage device having stored thereon instructions that when executed by one or more processors result in the following operations including the method according to any one of examples 25 through 48.

Example 98

Another example of the present disclosure is a system including at least one device arranged to perform the method of any one of examples 25 through 48.

Example 99

Another example of the present disclosure is a device including means to perform the method of any one of examples 25 through 48.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system comprising:
a processor comprising at least one core;
a cache memory;
a performance monitoring unit (PMU);
a plurality of virtual machines (VMs), each VM to execute on at least one of the at least one core; and
cache sensitivity index (CSI) logic to allocate a cache portion to each of the plurality of VMs, the allocated cache portion related to a determined cache portion, determined based, at least in part, on a plurality of CSI values related to the plurality of VMs,
wherein each CSI value for a given VM is calculated using a change in cache misses over a period of time divided by a change in cache allocated to the VM over the period of time; and
wherein each CSI value for a given VM is determined periodically and a duration of time between each determination of each CSI value for a given VM is based on a variation of each CSI value for a given VM.

2. The system of claim 1, wherein the PMU is to count a first number, M1, of cache misses, the CSI logic is to increase a cache allocation of a selected VM by a cache allocation increment, $\Delta S$, the PMU is further to count a second number, M2, of cache misses and the CSI logic is further to determine the CSI value based, at least in part, on M1, M2 and $\Delta S$.

3. The system of claim 1, wherein the CSI logic is to allocate the determined cache portion to a priority VM if the determined cache portion is greater than a priority cache allocation.

4. The system of claim 1, wherein the CSI logic is to predict a CSI value for a selected VM based, at least in part, on a history.

5. The system of claim 1, wherein the CSI logic is to set a default cache allocation and a priority cache allocation.

6. The system of claim 5, wherein at least one of the priority cache allocation and/or the default cache allocation is related to a class of service (COS).

7. A method comprising:
calculating a change in cache misses for operations of each of a plurality of virtual machines (VMs);
calculating a change in cache allocated to operation of each of the plurality of VMs; and
allocating, by cache sensitivity index (CSI) logic, a cache portion to each of the plurality of VMs, the allocated cache portion related to a determined cache portion, determined, based at least in part, on a plurality of CSI values related to the plurality of VMs,
wherein each CSI value for a given VM is calculated using the change in cache misses over a period of time divided by the change in cache allocated to the VM over the period of time; and
wherein each CSI value for a given VM is determined periodically and a duration of time between each determination of each CSI value for a given VM is based on a variation of each CSI value for a given VM.

8. The method of claim 7, further comprising:
counting, by a performance monitoring unit (PMU), a first number, M1, of cache misses for a selected VM;
increasing, by the CSI logic, a cache allocation of the selected VM by a cache allocation increment, $\Delta S$;
counting, by the PMU, a second number, M2, of cache misses; and
determining, by the CSI logic, the CSI based, at least in part, on M1, M2 and $\Delta S$.

9. The method of claim 7, further comprising:
allocating, by the CSI logic, the determined cache portion to a priority VM if the determined cache portion is greater than a priority cache allocation.

10. The method of claim 7, further comprising:
predicting, by the CSI logic, the CSI for a selected VM based, at least in part, on a history.

11. The method of claim 7, further comprising:
setting, by the CSI logic, a default cache allocation; and
setting, by the CSI logic, a priority cache allocation.

12. The method of claim 11, wherein at least one of the priority cache allocation and/or the default cache allocation is related to a class of service (COS).

13. A computer readable storage device having stored thereon instructions that when executed by one or more processors result in the following operations comprising:
calculating a change in cache misses for operations of each of a plurality of virtual machines (VMs);
calculating a change in cache allocated to operation of each of the plurality of VMs; and
allocating a cache portion to each of the plurality of VMs, the allocated cache portion related to a determined cache portion, determined, based at least in part, on a plurality of cache sensitivity index (CSI) values related to the plurality of VMs,
wherein each CSI value for a given VM is calculated using the change in cache misses over a period of time divided by the change in cache allocated to the VM over the period of time; and
wherein each CSI value for a given VM is determined periodically and a duration of time between each determination of each CSI value for a given VM is based on a variation of each CSI value for a given VM.

14. The device of claim 13, wherein the instructions that when executed by one or more processors results in the following additional operations comprising:
counting a first number, M1, of cache misses;
increasing a cache allocation of a selected VM by a cache allocation increment, $\Delta S$;
counting a second number, M2, of cache misses; and
determining the CSI based, at least in part, on M1, M2 and $\Delta S$.

15. The device of claim 13, wherein the instructions that when executed by one or more processors results in the following additional operations comprising:
allocating the determined cache portion to a priority VM if the determined cache portion is greater than a priority cache allocation.

16. The device of claim 13, wherein the instructions that when executed by one or more processors results in the following additional operations comprising:
predicting the CSI for a selected VM based, at least in part, on a history.

17. The device of claim 13, wherein the instructions that when executed by one or more processors results in the following additional operations comprising:

setting a default cache allocation; and
setting a priority cache allocation.

18. The device of claim 17, wherein at least one of the priority cache allocation and/or the default cache allocation is related to a class of service (COS).

19. The system of claim 1, wherein the determined cache portion for a given VM is proportional to the CSI value of the VM and is inversely proportional to CSI values associated with other VMs.

20. The method of claim 7, wherein the determined cache portion for a given VM is proportional to the CSI value of the VM and is inversely proportional to CSI values associated with other VMs.

21. The device of claim 13, wherein the determined cache portion for a given VM is proportional to the CSI value of the VM and is inversely proportional to CSI values associated with other VMs.

* * * * *